(12) United States Patent
Tokunaga

(10) Patent No.: US 7,859,545 B2
(45) Date of Patent: Dec. 28, 2010

(54) IMAGE PROCESSING APPARATUS AND IMAGE PROCESSING METHOD

(75) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 535 days.

(21) Appl. No.: 11/718,372

(22) PCT Filed: Nov. 1, 2005

(86) PCT No.: PCT/JP2005/020403

§ 371 (c)(1),
(2), (4) Date: May 1, 2007

(87) PCT Pub. No.: WO2006/049290

PCT Pub. Date: May 11, 2006

(65) Prior Publication Data

US 2008/0007564 A1    Jan. 10, 2008

(30) Foreign Application Priority Data

Nov. 1, 2004    (JP) .............................. 2004-317915
Oct. 27, 2005    (JP) .............................. 2005-313164

(51) Int. Cl.
*G09G 5/00*    (2006.01)
*G09G 5/02*    (2006.01)
*G03F 3/08*    (2006.01)
*G06K 9/00*    (2006.01)
*G06K 9/40*    (2006.01)
*H04N 5/46*    (2006.01)
*H04N 5/475*    (2006.01)
*H04N 1/40*    (2006.01)

(52) U.S. Cl. .................. 345/581; 345/589; 345/593; 345/600; 345/619; 348/498; 348/514; 348/557; 358/518; 358/537; 358/448; 382/162; 382/167; 382/254

(58) Field of Classification Search ................. 345/581, 345/589–591, 593–594, 597, 600–604, 549, 345/619; 348/498, 502, 514, 557, 560–564, 348/630, 639; 358/515–518, 523–525, 537, 358/452, 447–448; 382/162–167, 254, 274, 382/276, 282
See application file for complete search history.

(56) References Cited

U.S. PATENT DOCUMENTS 5,844,542 A    12/1998    Inoue et al.

(Continued)

FOREIGN PATENT DOCUMENTS

JP    01-315774    12/1989

(Continued)

OTHER PUBLICATIONS

Chinese Office Action concerning Appln 2005800359827 dated Apr. 11, 2008 and translation of same.

(Continued)

*Primary Examiner*—Wesner Sajous
(74) *Attorney, Agent, or Firm*—Cowan, Liebowitz & Latman, P.C.

(57) ABSTRACT

Conventionally, a user interface used to change the color of a digital image has a configuration in which three elements, i.e., hue, chroma, and brightness are independent from each other, and the relationship among the three elements are difficult to be recognized, resulting in poor usability. This invention provides a user interface which movably displays a color object that represents an original color on a chromaticity diagram that expresses an arbitrary color system. The user can designate a destination color by moving the color object on the chromaticity diagram. For this reason, the user can easily select and designate a practical color.

26 Claims, 11 Drawing Sheets
(5 of 11 Drawing Sheet(s) Filed in Color)

U.S. PATENT DOCUMENTS

| | | | |
|---|---|---|---|
| 6,108,441 A | | 8/2000 | Hiratsuka et al. |
| 6,611,297 B1 * | | 8/2003 | Akashi et al. ............... 348/739 |
| 6,850,245 B1 * | | 2/2005 | Murashita et al. ........... 345/589 |
| 2004/0017586 A1 * | | 1/2004 | Nichogi ....................... 358/2.1 |
| 2006/0176311 A1 * | | 8/2006 | Kimoto et al. .............. 345/589 |

FOREIGN PATENT DOCUMENTS

| JP | 02-100184 | 4/1990 |
|---|---|---|
| JP | 06-334852 | 12/1994 |
| JP | 08-186727 | 7/1996 |
| JP | 09-186907 A | 7/1997 |
| JP | 09-205658 | 8/1997 |
| JP | 09-258706 | 10/1997 |
| JP | 2000-013628 A | 1/2000 |

OTHER PUBLICATIONS

English translation of International Preliminary Report on Patentability concerning the basic PCT application JP2005/020403 dated Apr. 17, 2007.

The above references were cited in a Jun. 18, 2010 Japanese Office Action, which is enclosed without English translation, that issued in Japanese Patent Applciation No. 2005-313164.

* cited by examiner

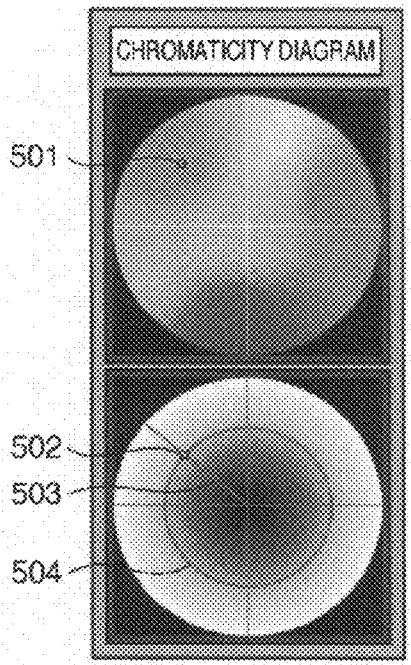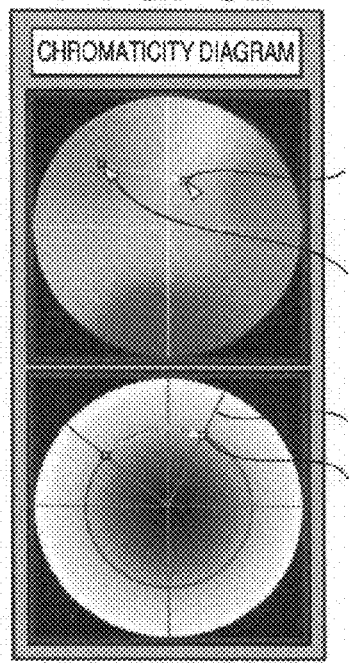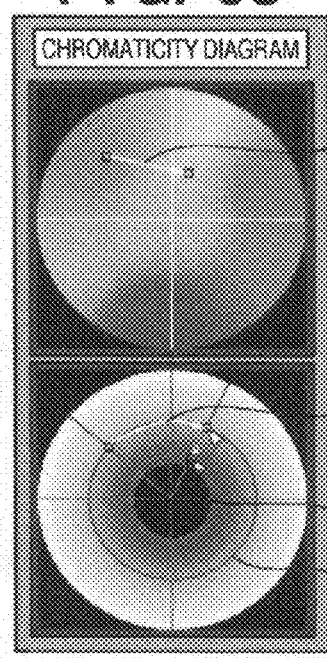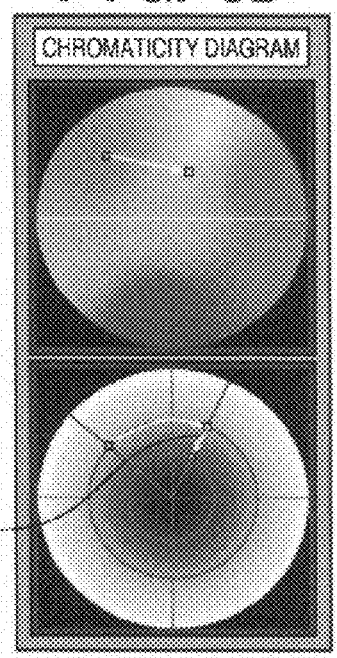

F I G. 6
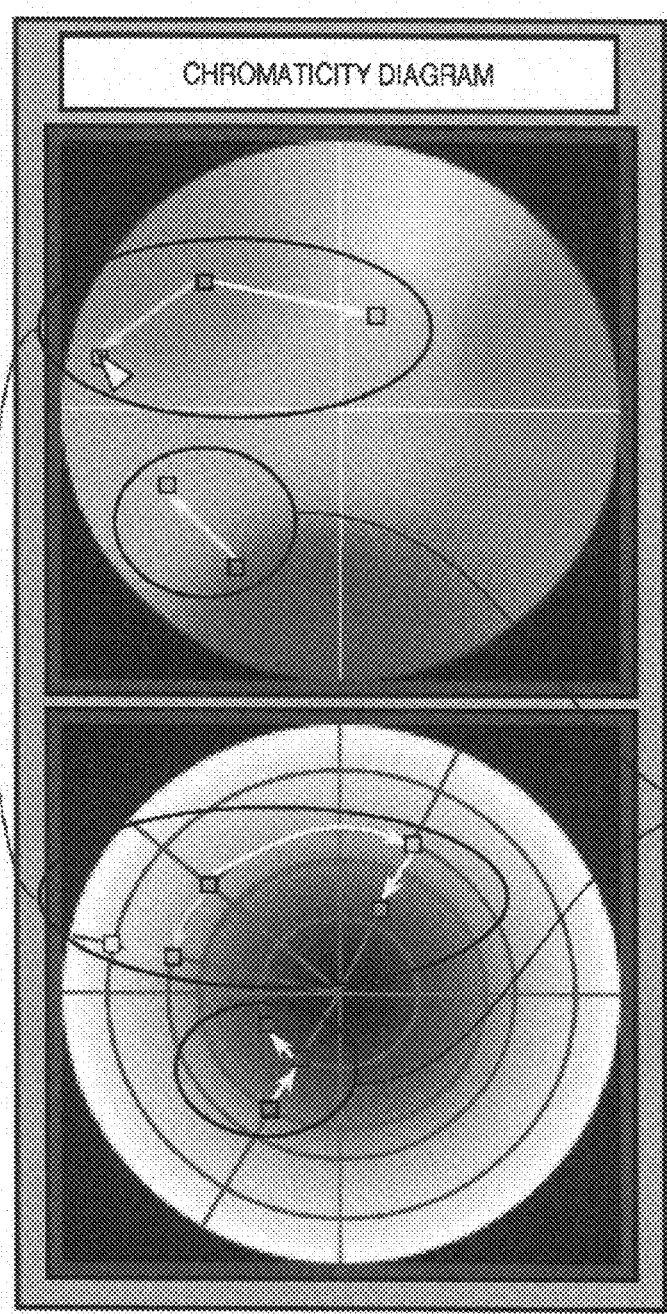

US 7,859,545 B2

IMAGE PROCESSING APPARATUS AND IMAGE PROCESSING METHOD

CLAIM OF PRIORITY

This application claims priority from Japanese Patent Applications No. 2004-317915 filed on Nov. 1, 2004 and No. 2005-313164 filed on Oct. 27, 2005, which are hereby incorporated by reference herein.

TECHNICAL FIELD

The present invention relates to an image processing apparatus and image processing method, which make a display that allows the user to easily and visually recognize color information selected and changed by himself or herself upon retouching a digital image by a computer, digital camera, or the like.

BACKGROUND ART

Nowadays, with striking popularization of digital cameras, the chances of handling digital images are increasing at home and businesses alike. Based on this, it is demanded to improve the functions of application software aiming at retouching images (e.g., to change a digital image to a favorite tint). To meet such user's demand, developers are now developing various kinds of software with various functions.

In such software, as a general user interface used to change the color of a digital image, a GUI (Graphical User Interface) which categorizes change items into three elements, i.e., hue, chroma, and brightness, and allows the user to change respective items is known (e.g., see Japanese Patent Laid-Open No. 08-186727).

The user changes the values of the respective elements by, e.g., moving slider bars which are movable to the right and left, or by inputting numerical values of hue, chroma, and brightness. In order to confirm the degree of a change in color, the following method is used. That is, a digital image to which the change is immediately applied is displayed, so that digital images with the original and destination colors are displayed side by side on the screen, and the color selected by the user is changed to a favorite color on a dedicated color palette.

However, the conventional user interface has a configuration for independently changing three elements, i.e., hue, chroma, and brightness. For example, when a color is to be changed, slider bars equipped for these three elements must be moved. For this reason, it is difficult for the user to recognize information about the relevance of the three elements and a changeable color range, and a long time is required to find out a desired color. It is also difficult to visually recognize the relationship between the original and destination colors on the color space. Conventionally, some interfaces display one of the original and destination colors on a chromaticity diagram, but no interfaces that simultaneously display the original and destination colors are available.

DISCLOSURE OF INVENTION

The present invention has been made in consideration of the conventional problems, and has as its object to provide an image processing apparatus and image processing method, which make a display that allows the user to easily and visually recognize color information selected and changed by himself or herself.

According to an aspect of the present invention, there is provided an image processing apparatus characterized by comprising: image display unit adapted to display a digital image; chromaticity diagram display unit adapted to display a chromaticity diagram which expresses an arbitrary color system; selection unit adapted to allow a user to select an arbitrary color; color object display unit adapted to display the color selected by the selection unit on the chromaticity diagram displayed by the chromaticity diagram display unit as a color object; and color object moving unit adapted to move the color object on the chromaticity diagram in response to a user operation, and wherein the color object displayed by the chromaticity diagram display unit and the color object moved by the color object moving unit are simultaneously displayed on the chromaticity diagram displayed by the chromaticity diagram display unit.

According to another aspect of the present invention, there is provided an image processing method characterized by comprising: an image display step of displaying a digital image; a chromaticity diagram display step of displaying a chromaticity diagram which expresses an arbitrary color system; a selection step of allowing a user to select an arbitrary color; a color object display step of displaying the color selected in the selection step on the chromaticity diagram displayed in the chromaticity diagram display step as a color object; and a color object moving step of moving the color object on the chromaticity diagram in response to a user operation, and wherein the color object displayed by the chromaticity diagram display step and the color object moved in the color object moving step are simultaneously displayed on the chromaticity diagram displayed in the chromaticity diagram display step.

According to the invention of the present application, when the user wants to change a color selected on a chromaticity diagram including hue, chroma, and brightness elements, he or she can easily understand the relationship among hue, chroma, and brightness. Since the user can confirm information about a changeable color range from the chromaticity diagram at a glance, he or she can easily find out a target color. Since color objects before and after movement, which are displayed on the chromaticity diagram, are simultaneously displayed, the user can easily recognize the relationship between the original and destination colors. Furthermore, according to another invention of the present application, since the two color objects are connected via an arrow, the user can recognize a history, i.e., how the color has been changed, at a glance.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF DRAWINGS

The accompanying drawings, which are incorporated in and constitute a part of the specification, illustrate embodiments of the invention and, together with the description, serve to explain the principles of the invention.

The patent or application file contains at least one drawing executed in color. Copies of this patent or patent application publication with color drawings will be provided by the Office upon request and payment of the necessary fee.

FIGS. 5A to 5D are views showing an example of changes in state of the chromaticity diagram presented by the image processing apparatus according to the first embodiment upon color conversion processing;

FIG. 6 is a view showing another example of a change in state of the chromaticity diagram presented by the image processing apparatus according to the first embodiment upon color conversion processing;

BEST MODE FOR CARRYING OUT THE INVENTION

Preferred embodiments of the present invention will now be described in detail in accordance with the accompanying drawings.

First Embodiment

Figure 2:
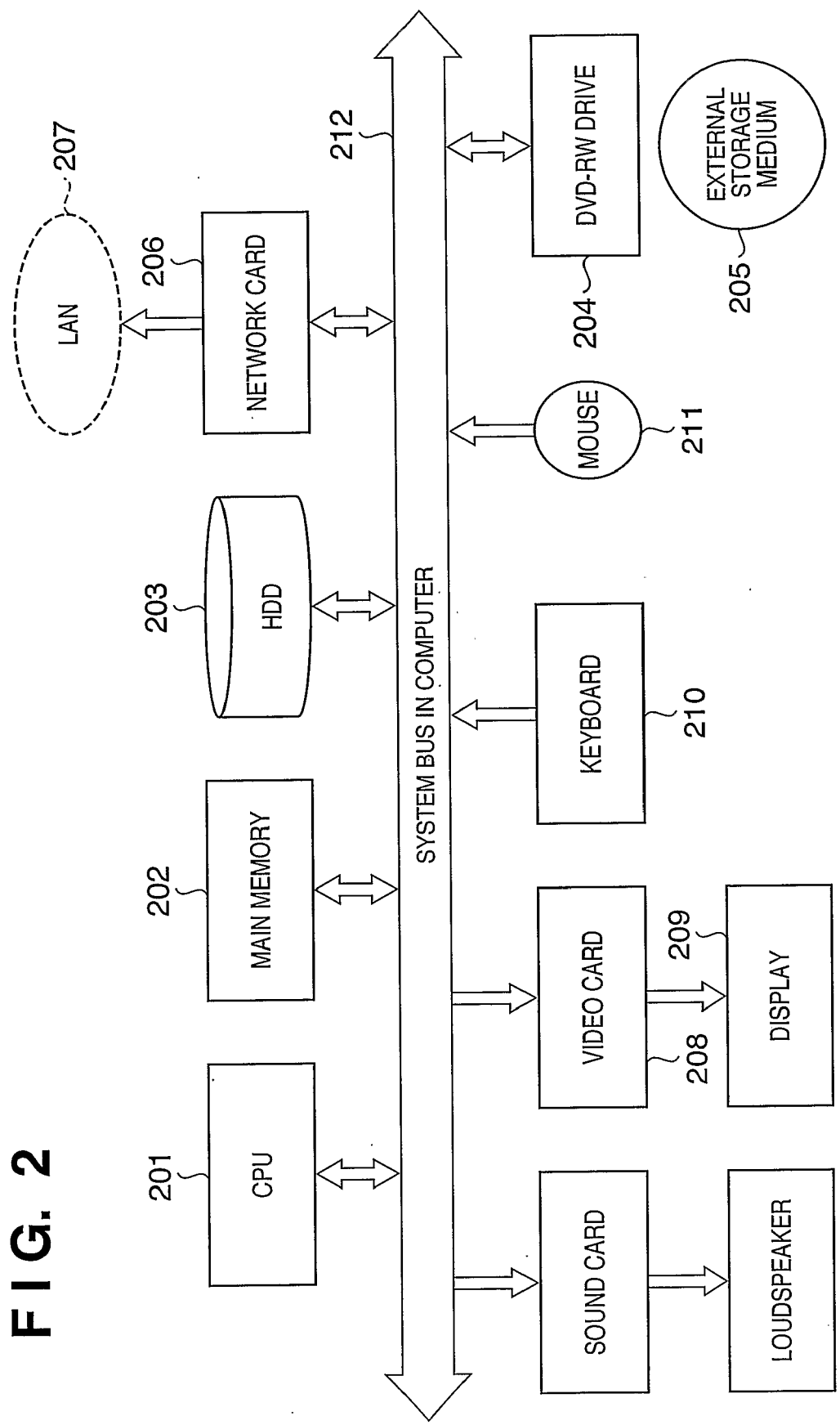
FIG. 2 is a block diagram showing an example of the arrangement of the image processing apparatus according to the first embodiment.

FIG. 2 is a block diagram showing an example of the arrangement of an image processing apparatus according to the first embodiment of the present invention.

As shown in FIG. 2, the image processing apparatus of this embodiment can be implemented by a general-purpose computer apparatus which is commercially available as a personal computer. Referring to FIG. 2, reference numeral 201 denotes an arithmetic processing device (CPU) which controls the operation of the image processing apparatus.

Reference numeral 202 denotes a memory module on which a program and image data are mapped. The program includes a program code for performing image display and image processing control, and is executed via the CPU.

Reference numeral 203 denotes a hard disk which records programs including an image processing program (retouch application; to be described later) and digital data such as image data and the like.

Reference numeral 204 denotes an external storage medium reader/writer. When the program and image data are recorded on an external storage medium 205, they are loaded onto the memory module via the external storage medium reader/writer. FIG. 2 exemplifies a DVD-RW drive. Also, the external storage medium reader/writer includes optical disks such as a CD-ROM, CD-R, DVD-RAM, and the like, magnetic disks such as a flexible disk, MO, and the like, and a nonvolatile memory such as a flash memory and the like.

Reference numeral 206 denotes a network card. A program and image data recorded on an accessible recording device are loaded by connecting a LAN 207, WWW, or the like via this device.

This embodiment adopts a mode which makes the computer apparatus function as the image processing apparatus of this embodiment by loading the program and image data recorded on the hard disk drive onto the memory module, and executing them by the CPU. However, at least some steps of color conversion processing to be described later can be implemented by the digital camera main body or dedicated hardware.

Reference numeral 208 denotes a video card which outputs a video signal of image data or the like. The output signal is input to a display unit (display) 209 such as a CRT display, liquid crystal display panel, or the like, which displays the image data or the like.

Reference numerals 210 and 211 denote a keyboard and mouse which correspond to a user operation unit.

Reference numeral 212 denotes a system bus such as a PCI bus or the like, which interconnects respective processing units in the image processing apparatus.

Figure 1:
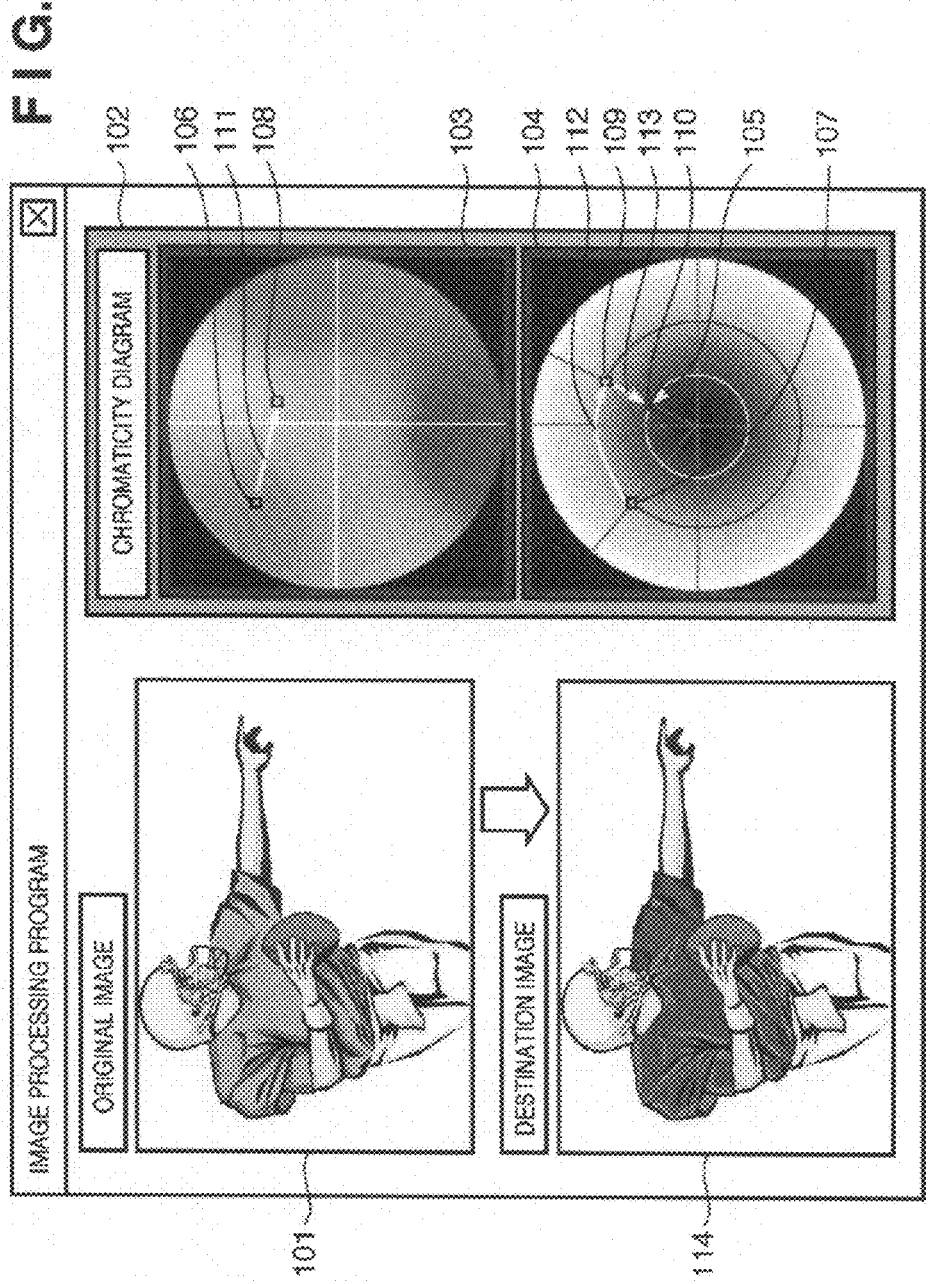
FIG. 1 shows an example of a user interface presented by an image processing apparatus according to the first embodiment of the present invention.

FIG. 1 shows an example of a user interface which is presented on the display 209 upon executing the image processing program having an image retouch function including color conversion processing in the image processing apparatus of this embodiment. The user can input instructions to the image processing apparatus by operating a GUI shown in FIG. 1 using the keyboard 210 and mouse 211. The user operation unit uses devices which are generally used, such as a mouse and keyboard, joy pad, operation buttons and a touch panel attached to the apparatus, and the like. This embodiment adopts a mode that uses the mouse 211 as an operation unit.

Referring to FIG. 1, reference numeral 101 denotes original image data. The original image data is loaded by the user when he or she selects it from digital image data stored in a storage device such as a hard disk drive or the like or an external device such as a digital camera or the like by, e.g., a known method. The user can select an arbitrary color included in the original image data by selecting a pixel or small region of the original image data by operating the user operation unit.

Reference numeral 102 denotes a chromaticity diagram. This embodiment adopts a chromaticity diagram of an L*a*b* color system. The chromaticity diagram 102 presented by the image processing apparatus of this embodiment includes a hue/chroma diagram 103 indicating hue and chroma, and a brightness diagram 104 indicating brightness. The user can select an arbitrary color on the hue/chroma diagram 103 by operating the user operation unit. Also, the user can display a color object on the chromaticity diagram. Details of the chromaticity diagram will be described later.

Reference numeral 105 denotes a mouse pointer which moves in accordance with the operation of the user operation unit.

Reference numeral 106 denotes a color object which is displayed on the hue/chroma diagram 103 when the user selects an arbitrary color on the original image data 101 or the chromaticity diagram. The color object is displayed using a circular pattern, rectangular pattern, or the like. This embodiment adopts a rectangular display.

Reference numeral 107 denotes a color object which is displayed on the brightness diagram 104 upon selection of an arbitrary color on the original image data 101. The color object is displayed using a circular pattern, rectangular pattern, or the like. This embodiment adopts a rectangular display as in the color object 106.

The color object 107 is displayed at a position where the following angles are always equal to each other:

an angle a straight line which is drawn in the vertical direction to pass through the center of the circle of the hue/chroma diagram 103 makes with a straight line which passes through the center of the circle of the hue/chroma diagram 103 and the color object 106; and an angle a straight line which is drawn in the vertical direction to pass through the center of the circle of the brightness diagram 104 makes with a straight line which passes through the center of the circle of the brightness diagram 104 and the color object 107.

Reference numeral 108 denotes a color object which is displayed by moving (e.g., dragging and dropping) the color object 106 on the hue/chroma diagram 103 using the mouse pointer 105. The display color of at least a portion of the color object is changed to that at the position of the moving destination on the hue/chroma diagram.

Reference numeral 109 denotes a color object which is moved on the brightness diagram 104 in correspondence with the moved color object 108.

Reference numeral 110 denotes a color object which is displayed by moving the color object 109 on the brightness diagram 104 using the mouse pointer 105. The color of at least a portion of the color object is changed to that corresponding to brightness at the position of the moving destination.

Reference numerals 111, 112, and 113 denote lines which connect the color objects 106 and 108, 107 and 109, and 109 and 110. This embodiment adopts a mode that displays line segment arrows.

Reference numeral 114 denotes an image when the color which is changed on the chromaticity diagram by the user operation is applied to the original image. This image will be referred to as a destination image hereinafter.

The user selects a color to be changed on the original image or on the chromaticity diagram using, e.g., the mouse pointer 105 from the screen shown in FIG. 1. In response to this selection, the image processing apparatus displays a color object on the chromaticity diagram 102. The user then moves the color object displayed on the chromaticity diagram using the mouse to change that color, thus retouching an image.

The chromaticity diagram presented by the image processing apparatus of this embodiment will be described in more detail below using FIG. 3.

The chromaticity diagram used in this embodiment adopts an L*a*b* color system. The L*a*b* color system is standardized by Commission Internationale de l'Eclairage (CIE) in 1976, and is also adopted by JIS (JISZ8729) in Japan. On the L*a*b* color system, brightness is expressed by L*, and hue and chroma are expressed by a* and b*.

Figure 3:
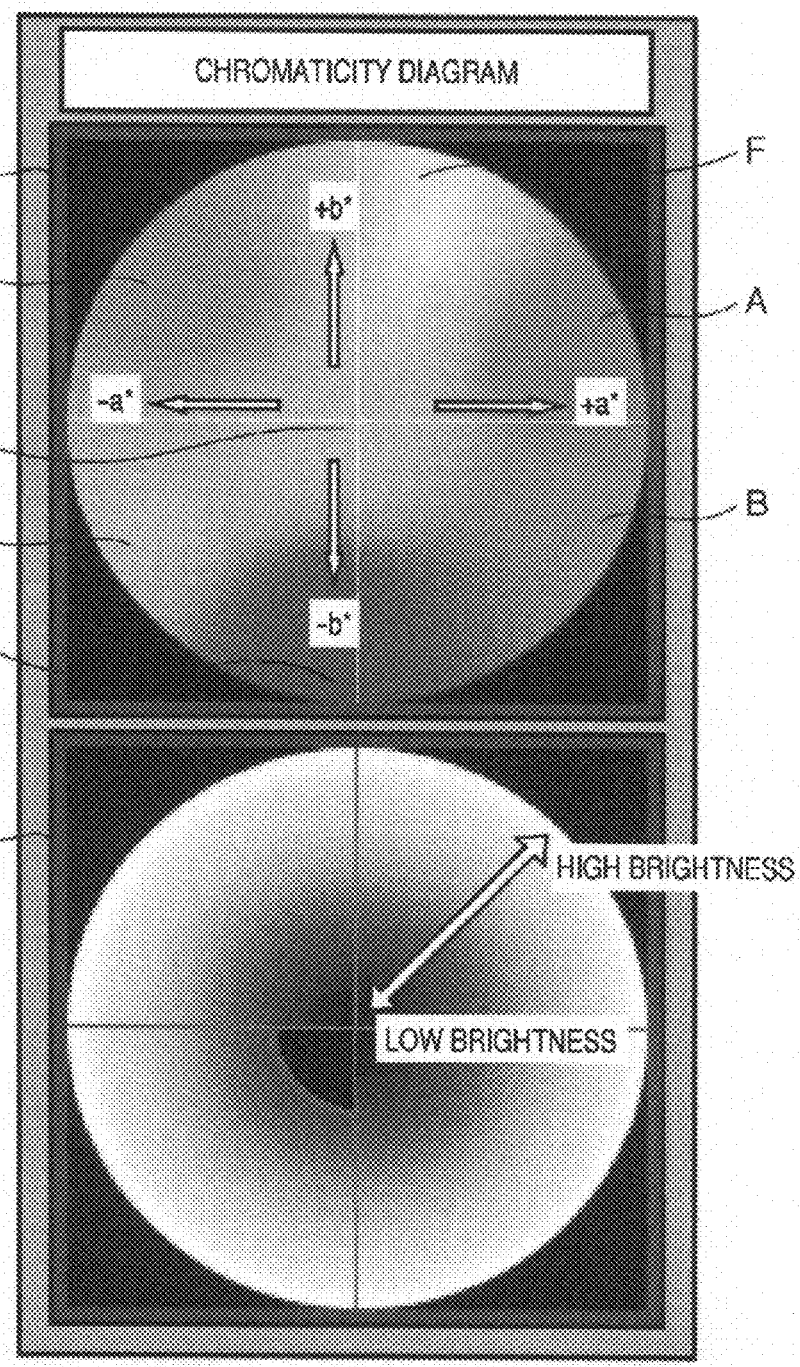
FIG. 3 is a view for explaining a chromaticity diagram presented by the image processing apparatus according to the first embodiment.

On the chromaticity diagram in FIG. 3, reference numeral 103 denotes a hue/chroma diagram. Hue is an index that indicates tint, and chroma is an index that indicates vividness of a color. A color becomes more vivid with increasing chroma value, and it becomes closer to gray with decreasing chroma value. In a circle of FIG. 3, the right direction indicates +a*, the left direction indicates −a*, the up direction indicates +b*, and the down direction indicates −b*. Hence, a color layout complying with a hue circle of the L*a*b* color system is adopted. More specifically, red, pink, blue, aqua, green, yellow, and gray are continuously laid out at A, B, C, D, E, F, and G. The chroma value becomes lower as it is closer to the center of the circle, and it becomes higher as it is farther from the center.

On the chromaticity diagram of FIG. 3, reference numeral 104 denotes a brightness diagram. Brightness is an index that indicates the lightness of a color. A color becomes closer to white with increasing brightness value, and it becomes closer to black with decreasing brightness value. On the brightness diagram 104, the brightness value becomes lower as it is closer to the center of the circle, and it becomes higher as it is farther from the center.

Note that a similar chromaticity diagram can be realized by color systems other than the L*a*b* color system, e.g., an XYZ color system, Munsell color system, RGB color system, USC color system, L*c*h color system, and the like, and a chromaticity diagram based on an arbitrary color system can be used.

Figure 11:
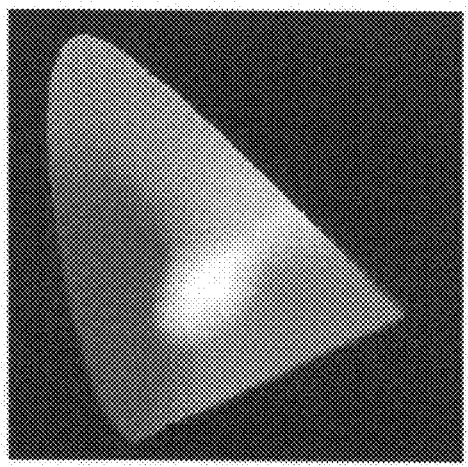
FIG. 11 shows an example of an X-Y chromaticity diagram.

Note that a similar chromaticity diagram (hue/chroma diagram) can be realized on color systems other than the L*a*b* color system, such as a Munsell color system, Ostwald color system, and CIE-compliant color system, and a chromaticity diagram based on an arbitrary color system can be used. The reason why the chromaticity diagram is used is that the user can visually understand the concept of a color system. That is, this embodiment uses the chromaticity diagram which can be expressed by a circle. However, the present invention is not limited to a circular chromaticity diagram as long as coordinates can be acquired from a chromaticity diagram like an X-Y chromaticity diagram shown in FIG. 11. As for the brightness diagram, a diagram having the same format as in FIG. 1 can be used.

The color conversion processing operation of the image processing apparatus of this embodiment and a change in display state of the chromaticity diagram will be described below using FIG. 4 and FIGS. 5A to 5D.

Figure 4:
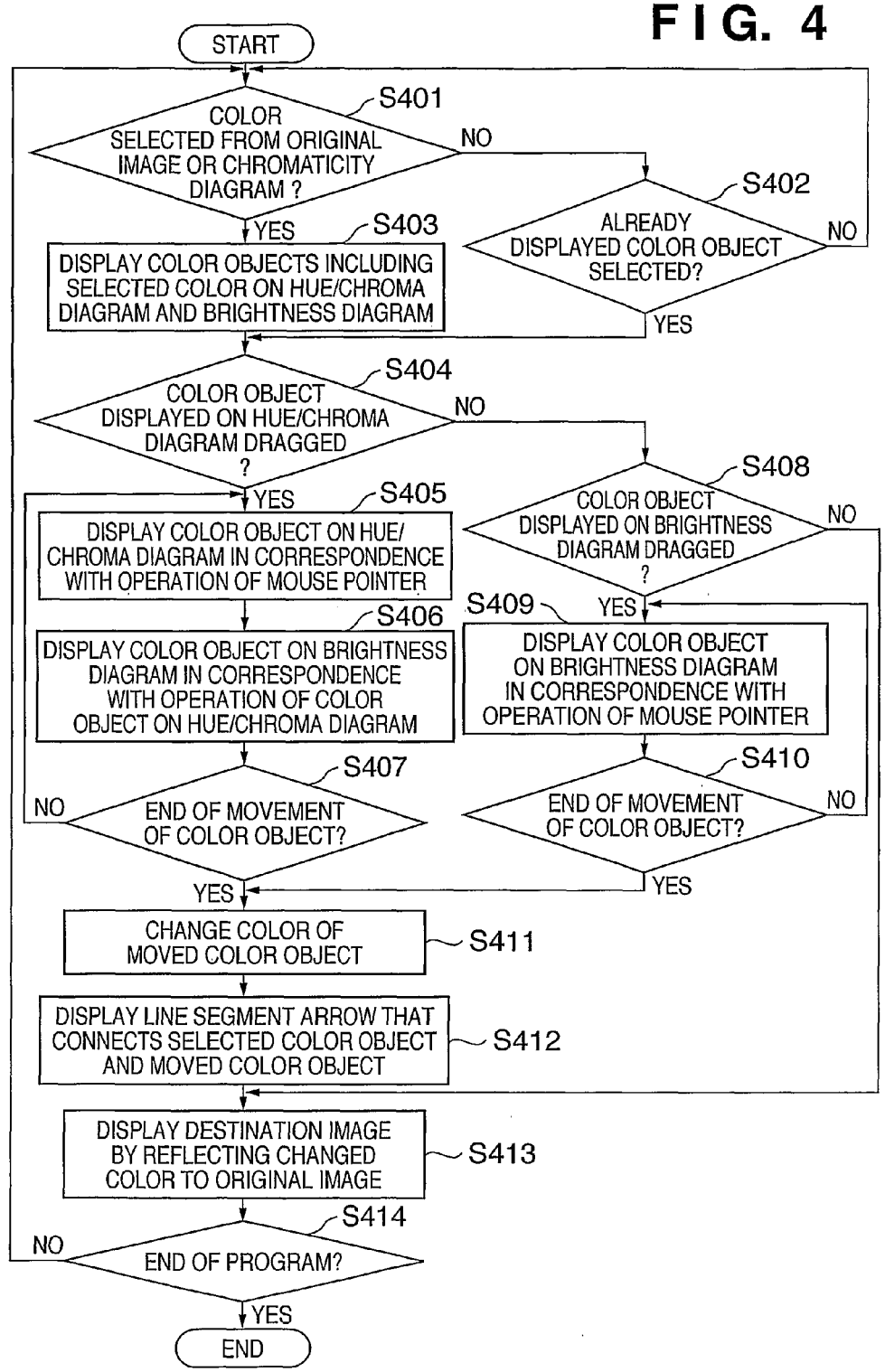
FIG. 4 is a flowchart for explaining a color conversion processing sequence of the image processing apparatus according to the first embodiment.

FIG. 4 is a flowchart for explaining the color conversion processing operation of the image processing apparatus of this embodiment. FIGS. 5A to 5D show an example of changes in state of the chromaticity diagram presented by the image processing apparatus upon color conversion processing, and show user operations for color objects and changes in display corresponding to the operations.

If the user selects an arbitrary color on the displayed original image 101 or on the chromaticity diagram 102 in S401 in FIG. 4, the flow advances to S403. Color objects 501 and 502 are respectively displayed on the hue/chroma diagram 103 and brightness diagram 104 of the chromaticity diagram.

If an arbitrary color on the displayed original image 101 is selected, the color object 501 is displayed at a position where the selected color and the position of a color on the hue/chroma diagram 103 match (FIG. 5A). If an arbitrary color on the chromaticity diagram 102 is selected, the color object 501 is displayed at that position (FIG. 5A).

On the brightness diagram 104, the color object 502 is displayed at a position corresponding to that of the color object 501 displayed on the hue/chroma diagram 103 (FIG. 5A). The corresponding position is as has been described about that of the color object 107 in FIG. 1. As will be described later, the display color of the color object 502 corresponds to the color on the hue/chroma diagram 103 indicated by the color object 501. Therefore, in the example of FIG. 5A, the color object 502 is displayed in yellow-green. After the color object 502 is displayed, a straight line 503 which connects the center of the circle of the brightness diagram 104 and the color object 502, and a circle which has the center of the circle of the brightness diagram 104 and the color object 502 as a radius are simultaneously displayed (FIG. 5A).

If no color is selected from the original image 101 or chromaticity diagram 102, it is confirmed in S402 if a color object which has already been displayed is selected. If the already displayed color object is selected, the flow advances to S404.

It is confirmed in S404 if the color object displayed on the hue/chroma diagram 103 is dragged using the mouse pointer as the user operation unit. If the color object displayed on the hue/chroma diagram 103 is dragged, the flow advances to S405; if the color object displayed on the brightness diagram 104 is dragged, the flow advances to S409 via S408.

S405, which is executed when the color object displayed on the hue/chroma diagram 103 is moved, will be described below. The user can move the color object 501 by dragging a mouse pointer 505 in FIG. 5B. The color object 501 can be moved to an arbitrary position within the circle of the hue/chroma diagram 103. In S405, the display position of the color object 501 on the hue/chroma diagram 103 is changed (FIG. 5B).

In S406, the display position of the color object 502 on the brightness diagram 104 in FIG. 5A is automatically changed in correspondence with the movement of the color object 501 (FIG. 5B). Note that the movable range of the color object 502 is limited to the circumference of a circle 504 in FIG. 5A. This is because brightness remains the same even when the hue/chroma values are changed.

The processes in S405 and S406 are repeated until it is determined in S407 that the movement of the color object ends.

For example, as shown in FIG. 5B, when the user moves the color object 501 to a color object 506, the color object 502 is moved to a color object 507 along an arc of the circle 504, as indicated by the dotted line in FIG. 5B. When the drag processing is complete and the moving position of the color object is settled, a straight line 508 which passes through the center of the circle of the brightness diagram 104 and the color object 507 is displayed (FIG. 5B). Note that the display color of the color object 507 after movement corresponds to a color indicated by the corresponding color object 506 on the hue/chroma diagram 103, and it is a yellowish color in FIG. 5B, as will be described later.

A case will be explained below wherein the color object displayed on the brightness diagram 104 is dragged in S408. The color object displayed on the brightness diagram 104 can be moved along a straight line which connects the center of the circle of the brightness diagram 104 and the color object. For example, the color object 507 can be moved along the straight line 508 in FIG. 5B. In S409, the color object is moved along the straight line 508 on the brightness diagram 104 in response to the user's drag operation, as indicated by the dotted line in FIG. 5C. The process in S409 is repeated until it is determined in S410 that the movement of the color object ends.

Upon completion of the movement, a circle which has the moved color object and the center of the circle of the brightness diagram 104 as a radius is displayed (FIG. 5C). For example, in FIG. 5C, when the color object 507 is moved to a color object 511, a circle 512 is displayed. In this step, since only brightness is changed, the color object 506 on the hue/chroma diagram 103 is not moved.

If the end of the movement of the color object is confirmed in S407 or S410, the flow advances to S411. In S411, processing for changing the display color of the moved color object to a color indicated by the position of the color object at the moving destination is executed. That is, when the color object is moved on the hue/chroma diagram 103, the corresponding color object on the brightness diagram 104 is displayed in a color corresponding to the moved position. On the other hand, when the color object is moved on the brightness diagram 104, the brightness of the display color of the color object after movement is changed to that at the corresponding position.

In S412, processing for displaying a line segment arrow 509 (FIG. 5C), 510 (FIG. 5C), or 513 (FIG. 5D) that connects the color object selected and displayed in S402 or S403 and the moved color object is executed. This embodiment adopts a mode that displays a line segment arrow. Alternatively, a line segment, dotted line segment, or dotted line segment arrow, or the like may be used.

In S413, a destination image generated by applying processing for changing the color (original color) corresponding to the color object selected first to that (destination color) corresponding to the color object after completion of movement to the original image is displayed.

The color conversion result corresponds to the destination image 114 on the window shown in FIG. 1. If a program end instruction is input in S414, the program ends; otherwise, the flow returns to S401 to repeat the aforementioned processing.

Figure 8:
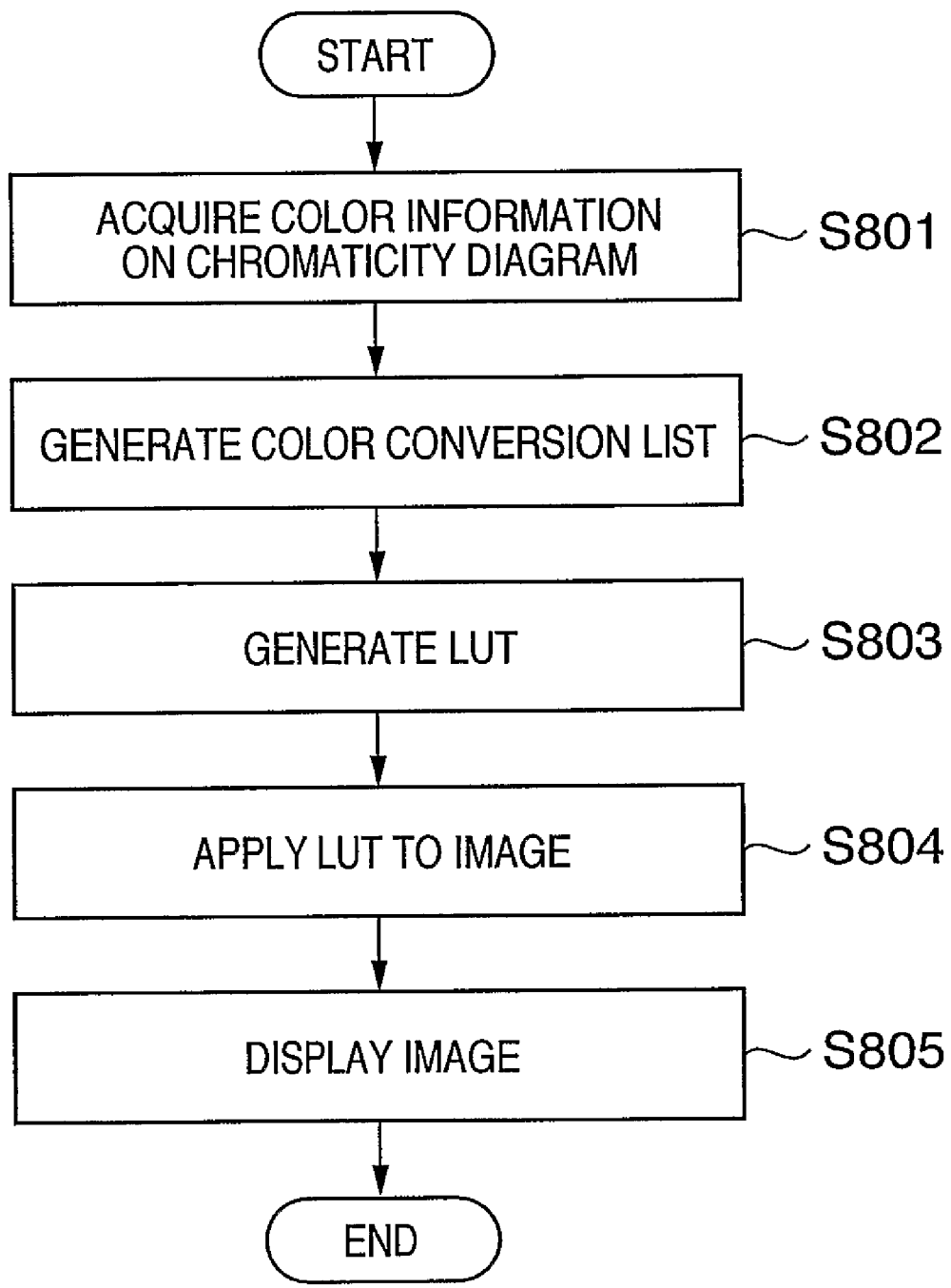
FIG. 8 is a flowchart showing color conversion processing.

Details of the processing in S413 for applying the processing for changing the color to that (destination color) corresponding to the color object after completion of movement to the original image will be described below using FIG. 1 and the flowchart of FIG. 8. In this embodiment, a three-dimensional lookup table (to be abbreviated as 3DLUT hereinafter) for color conversion is generated, and is applied to the original image to attain color conversion processing.

In S801, when the user clicks an arbitrary point on the original image 101 by operating the mouse pointer 105 using the mouse, a color object 106 before movement is displayed on the chromaticity diagram. When the user moves the color object 106 to a position where his or her favorite color is present on the hue/chroma diagram 103 by dragging it using the mouse, a color object 108 after movement is displayed. In this case, two pieces of color information on the chromaticity diagram at the positions of the color object 106 before movement and the color object 108 after movement are acquired.

The chromaticity diagram is set in advance with color information. More specifically, corresponding RGB values are set at all coordinate positions where the color object is movable on the chromaticity diagram. In the example shown in FIG. 1, a GUI including the chromaticity diagram complying with the Lab color system is presented. In this case as well, color information set in correspondence with each coordinate position of the chromaticity diagram is expressed by RGB values.

A method of converting coordinate values on the L*a*b* color space into those on the RGB color space is known to those who are skilled in the art. This method will be briefly explained below. More specifically, conversion can be attained in the sequence L*a*b*→XYZ→RGB.

If the L, a, and b values of the L*a*b* color system are respectively a brightness index L ($0 \leq L \leq 100$), perceivable chromaticity a ($-134 \leq b \leq 220$), and perceivable chromaticity b ($-140 \leq a \leq 122$), the R, G, and B values of the RGB color system are respectively R ($0R \leq 255$), G ($0 \leq G \leq 255$), and B ($0 \leq B \leq 255$), and the X, Y, and Z values of the XYZ color system are respectively X ($0 \leq x \leq 1$), Y ($0Y \leq 1$), and Z ($0 \leq Z \leq 1$), we have:

$$Lab \Rightarrow XYZ \quad (1)$$

$$x_\gamma = \begin{cases} f_x^3 & f_x^3 > 0.008856 \\ (116 \times f_x - 16)/903.3 & f_x^3 \leq 0.008856 \end{cases}$$

$$y_\gamma = \begin{cases} ((L+16)/116)^3 & L > 903.3 \times 0.008856 \\ L/903.3 & L \leq 903.3 \times 0.008856 \end{cases}$$

$$z_\gamma = \begin{cases} f_z^3 & f_z^3 > 0.008856 \\ (116 \times f_z - 16)/903.3 & f_z^3 \leq 0.008856 \end{cases}$$

$$f_x = \frac{a}{500} + f_y$$

$$f_y = \begin{cases} (L+16)/116 & y_y > 0.008856 \\ (903.3 \times y_y + 16)/116 & y_y \leq 0.008856 \end{cases}$$

$$f_z = f_y - \frac{b}{200}$$

$$X = x_\gamma \times X_\gamma$$
$$Y = y_\gamma \times Y_\gamma$$
$$Z = z_\gamma \times Z_\gamma$$

$$XYZ \Rightarrow RGB \quad (2)$$
$$R = 3.240479 \times X - 1.53715 \times Y - 0.498535 \times Z$$
$$G = -0.969256 \times X + 1.875991 \times Y + 0.041556 \times Z$$
$$B = 0.055648 \times X - 0.204043 \times Y + 1.057311 \times Z$$

The RGB values of respective points on the L*a*b* chromaticity diagram are calculated and set by arithmetic operations of formulas (1) and (2). Therefore, corresponding RGB values can be acquired on the basis of a position on the chromaticity diagram where the color object is currently located.

Figure 10:
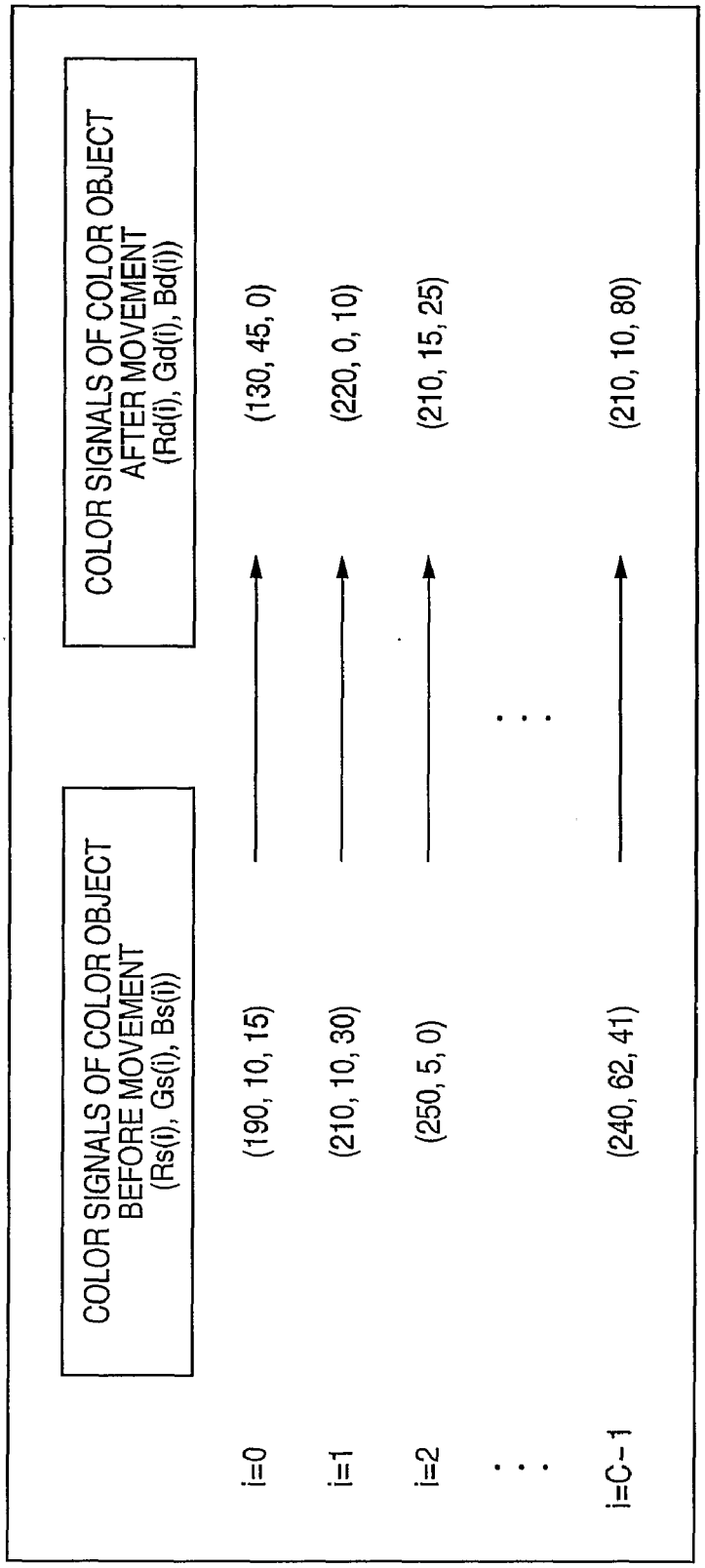
FIG. 10 shows the configuration of a color conversion list.

In S802, the acquired RGB values (Rs(i), Gs(i), Bs(i)) of the color object before movement are associated with the RGB values (Rd(i), Gd(i), Bd(i)) of the color object after movement. If there are a plurality of color objects before and after movement, as shown in FIG. 6 (to be described later), a color conversion list which associates color objects before and after movement in individual color conversion processes is generated. FIG. 10 shows an example of the color conversion list. The example shown in FIG. 10 shows a case wherein the number of colors to be converted, which is set by the user, is C. Hence, i=0 to C−1.

In S803, a 3DLUT (three-dimensional lookup table) is generated on the basis of the generated color conversion list. In this embodiment, in order to reduce the 3DLUT size, a 3DLUT is generated by preparing 729 (=9×9×9) three-dimensional representative grid points obtained by dividing R, G, and B value ranges (from a minimum value (0) to a maximum value (255)) into 8. When the 3DLUT as a color conversion table is applied to the original image, RGB values after conversion corresponding to those other than representative grid points are calculated from RGB values corresponding to representative grid points by interpolation. The interpolation processing will be described later.

Initially, reference values as a basis of the 3DLUT are generated. As these values, R, G, and B values (R(n), G(n), B(n)) (n=0 to 728) are generated in increments of 32 steps, as described above. RGB values close to the generated reference values (R(n), G(n), B(n)) are retrieved from the color conversion list. This retrieval process is done using the following formula and a value difference E:

$$E = ((Rs(i) - R(n))^2 + (Gs(i) - G(n))^2 + (Bs(i) - B(n))^2)^{0.5} \quad (3)$$

If the value E is smaller than a threshold Th, difference values dR, dG, and dB are calculated from the color values of the color object before movement and the associated color values of the color object after movement.

$$dR(y) = Rs(i) - Rd(i)$$
$$dB(y) = Bs(i) - Bd(i)$$
$$dG(y) = Gs(i) - Gd(i) \quad (4)$$

This retrieval processing is executed for all values (i=0 to C−1), average values dRave, dGave, and dBave of dR, dG, and dB of all values whose value difference E from the reference values is equal to or smaller than Th are calculated, and color conversion parameters Rt(n), Gt(n), and Bt(n) for the reference values (R(n), G(n), B(n)) are calculated by arithmetic operations with the reference values.

$$Rt(n) = R(n) - dRave$$
$$Gt(n) = G(n) - dGave$$
$$Bt(n) = B(n) - dBave \quad (5)$$

If none of values whose E value is smaller than Th are found, Rt(n), Gt(n), and Bt(n) are calculated by:

$$Rt(n) = R(n)$$
$$Gt(n) = G(n)$$
$$Bt(n) = B(n) \quad (6)$$

The aforementioned processing is repeated until n=728.

As described above, the 3DLUT as the conversion parameters which reflect the color conversion list is determined.

In S804, the 3DLUT is applied to the original image 101. The application method is as follows.

Interpolation processing of values other than the representative grid points of the 3DLUT will be explained first. Let R, G, and B be the RGB values of a given pixel of the original image 101. Also, let Rout(R, G, B), Gout(R, G, B), and Bout(R, G, B) be the RGB values of the destination image 114 converted by applying the 3DLUT. Furthermore, let Ri, Gi, and Bi be the values of a representative grid point which are smaller than the RGB values R, G, and B of the original image 101 and are closest to them, Rout(Ri, Gi, Bi), Gout(Ri, Gi, Bi), and Bout(Ri, Gi, Bi) be output values (values after conversion) corresponding to this representative grid point, and Step (Step=32 in this embodiment) be the step width of the representative grid points.

$$R = Ri + Rf$$
$$G = Gi + Gf$$
$$B = Bi + Bf$$

$$Rout(R,G,B) = Rout(Ri+Rf, Gi+Gf, Bi+Bf) =$$

$$(Rout(Ri,Gi,Bi) \times (Step-Rf) \times (Step-Gf) \times (Step-Bf) +$$

$$Rout(Ri+Step,Gi,Bi) \times (Rf) \times (Step-Gf) \times (Step-Bf) +$$

$$Rout(Ri,Gi+Step,Bi) \times (Step-Rf) \times (Gf) \times (Step-Bf) +$$

$$Rout(Ri,Gi,Bi+Step) \times (Step-Rf) \times (Step-Gf) \times (Bf) +$$

$$Rout(Ri+Step,Gi+Step,Bi) \times (Rf) \times (Gf) \times (Step-Bf) +$$

$$Rout(Ri+Step,Gi,Bi+Step) \times (Rf) \times (Step-Gf) \times (Bf) +$$

$$Rout(Ri,Gi+Step,Bi+Step) \times (Step-Rf) \times (Gf) \times (Bf) +$$

$$Rout(Ri+Step, Gi+Step, Bi+Step) \times (Rf) \times (Gf) \times$$
$$(Bf))/(Step \times Step \times Step) \quad (7)$$

$$Gout(R,G,B) = Gout(Ri+Rf, Gi+Gf, Bi+Bf) =$$
$$(Gout(Ri, Gi, Bi) \times (Step-Rf) \times (Step-Gf) \times (Step-Bf) +$$
$$Gout(Ri+Step, Gi, Bi) \times (Rf) \times (Step-Gf) \times (Step-Bf) +$$
$$Gout(Ri, Gi+Step, Bi) \times (Step-Rf) \times (Gf) \times (Step-Bf) +$$
$$Gout(Ri, Gi, Bi+Step) \times (Step-Rf) \times (Step-Gf) \times (Bf) +$$
$$Gout(Ri+Step, Gi+Step, Bi) \times (Rf) \times (Gf) \times (Step-Bf) +$$
$$Gout(Ri+Step, Gi, Bi+Step) \times (Rf) \times (Step-Gf) \times (Bf) +$$
$$Gout(Ri, Gi+Step, Bi+Step) \times (Step-Rf) \times (Gf) \times (Bf) +$$
$$Gout(Ri+Step, Gi+Step, Bi+Step) \times (Rf) \times (Gf) \times$$
$$(Bf))/(Step \times Step \times Step) \quad (8)$$

$$Bout(R,G,B) = Bout(Ri+Rf, Gi+Gf, Bi+Bf) =$$
$$(Bout(Ri, Gi, Bi) \times (Step-Rf) \times (Step-Gf) \times (Step-Bf) +$$
$$Bout(Ri+Step, Gi, Bi) \times (Rf) \times (Step-Gf) \times (Step-Bf) +$$
$$Bout(Ri, Gi+Step, Bi) \times (Step-Rf) \times (Gf) \times (Step-Bf) +$$
$$Bout(Ri, Gi, Bi+Step) \times (Step-Rf) \times (Step-Gf) \times (Bf) +$$
$$Bout(Ri+Step, Gi+Step, Bi) \times (Rf) \times (Gf) \times (Step-Bf) +$$
$$Bout(Ri+Step, Gi, Bi+Step) \times (Rf) \times (Step-Gf) \times (Bf) +$$
$$Bout(Ri, Gi+Step, Bi+Step) \times (Step-Rf) \times (Gf) \times (Bf) +$$
$$Bout(Ri+Step, Gi+Step, Bi+Step) \times (Rf) \times (Gf) \times$$
$$(Bf))/(Step \times Step \times Step) \quad (9)$$

The 3DLUT application processing and interpolation arithmetic formulas using such formulas (7), (8), and (9) are simply expressed by:

$$(Rout, Gout, Bout) = LUT[(R,G,B)] \quad (10)$$

where R, G, and B are the input values, LUT is a 9×9×9 lookup table, and Rout, Gout, Bout are the results of the 3DLUT conversion and interpolation arithmetic operations.

Input values Rh, Gh, and Bh as the original image 101 are converted into output values RL, GL, and BL as the destination image 114 using the aforementioned arithmetic operation.

$$(RL, GL, BL) = LUT[(Rh, Gh, Bh)] \quad (11)$$

Using the aforementioned formulas, the 3DLUT is applied to all the input values of the original image, and output values which form the destination image are held.

Figure 9:
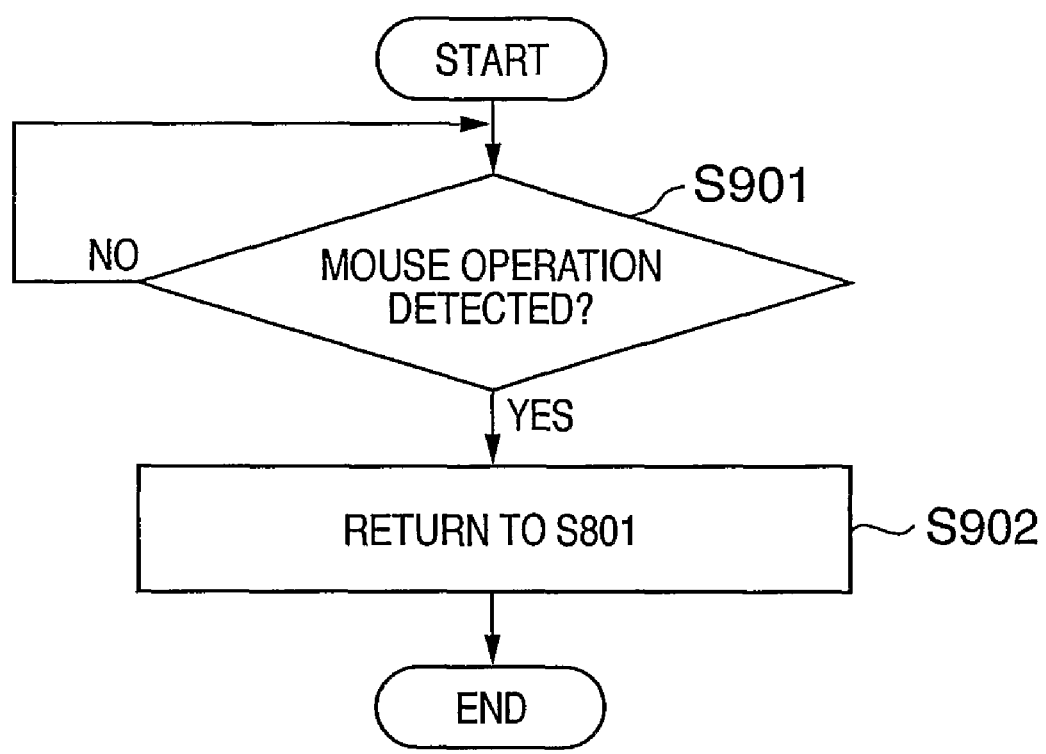
FIG. 9 is a flowchart showing mouse input waiting processing.

In S805, the output values output in S804 are displayed on the destination image 114. In this embodiment, the destination image is updated in real time in accordance with the movement of the color object. For this reason, in consideration of speeding up of the rendering time of the destination image, the mouse input waiting processing shown in the flowchart of FIG. 9 and the processing shown in FIG. 8 are parallelly executed during execution of S801 to S805. Therefore, if no mouse operation is detected in S901, a loop of S901 is executed; if a mouse operation is made, the control advances to S801 in S902.

As another mode of this embodiment, a [color conversion] button may be laid out on the GUI in FIG. 1. Color conversion may be not applied to the original image upon movement of a color object, and processes in S801 to S805 may be executed upon depression of the [color conversion] button to display the color conversion result.

Another display example of the chromaticity diagram 102 which can be applied in this embodiment will be described below using FIG. 6.

In 601 of FIG. 6, two moved color objects are displayed in correspondence with a color object which is displayed by selecting an arbitrary color on the original image 101 or chromaticity diagram 102. In the present invention, when movement is made a plurality of number of times, at least one color object whose color is changed from the selected color object can be displayed. That is, when a color object whose position has been moved once is moved again, an indication which indicates the previous position remains displayed, thus displaying color objects to link together. In this way, the color change history can be confirmed at a glance. Even when conversion is canceled, if the old color object on the chromaticity diagram is clicked using, e.g., the mouse, conversion from the same color as a start point to a different color can be implemented. When the color object is moved a plurality of number of times, the color conversion list is updated at a timing at which the flow returns to S801 and the 3DLUT is generated, so that the color object which is moved last serves as a conversion destination. On the chromaticity diagram, a trace of moved color objects is displayed as a change history, and the destination image is updated in real time.

602 of FIG. 6 shows a display example of a color object upon changing a color from brightness. FIGS. 5A to 5D have exemplified a case wherein the color object displayed on the hue/chroma diagram 103 is moved first. Alternatively, a color object displayed on the brightness diagram 104 may be moved first.

As can be seen from 601 and 602, a plurality of pairs of the color object displayed before movement and those after movement can be displayed on the chromaticity diagram.

Second Embodiment

The first embodiment has exemplified a case wherein the image processing apparatus of the present invention is implemented by a general-purpose computer apparatus. Alternatively, the image processing apparatus of the present invention can be implemented by another apparatus.

Figure 7:
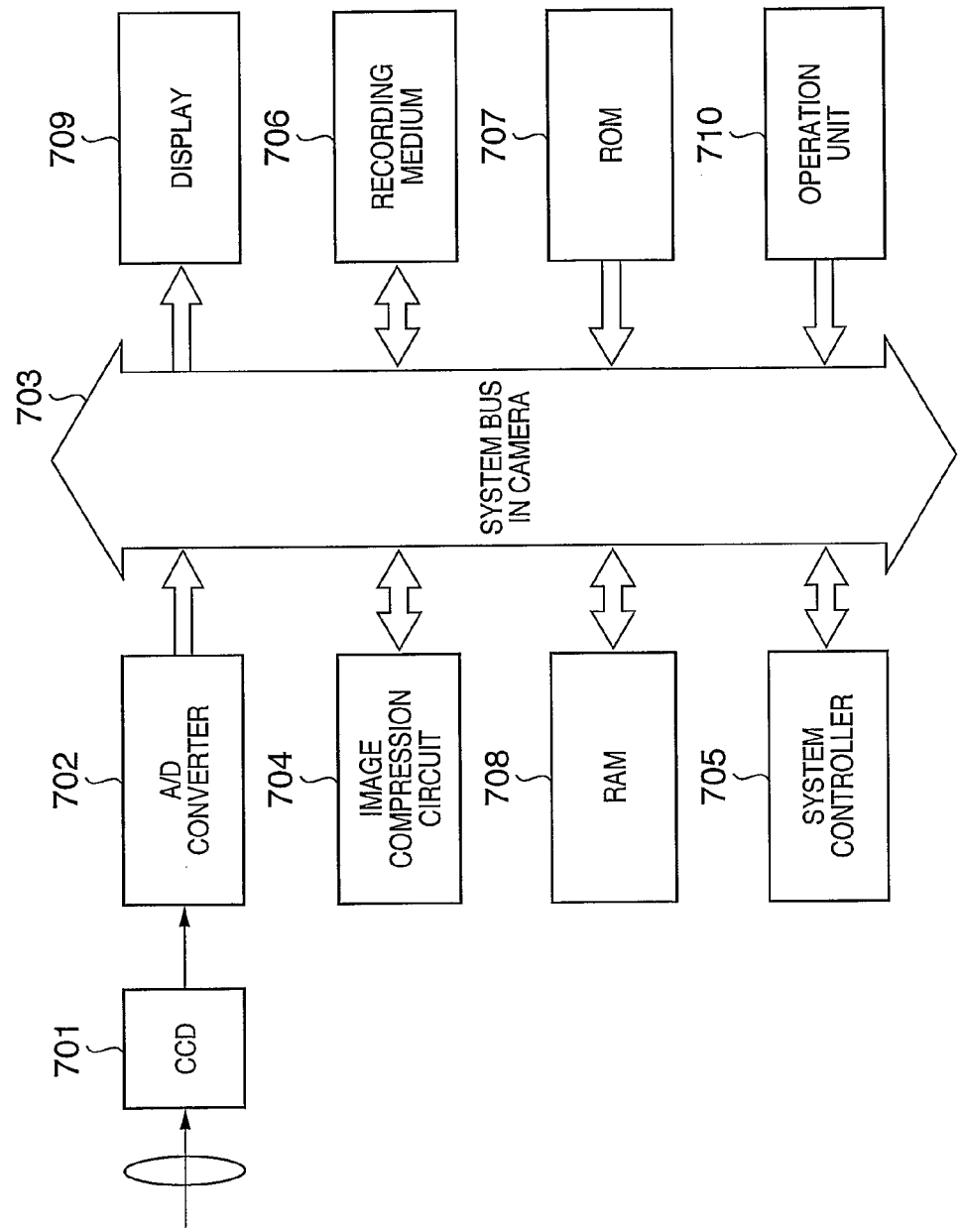
FIG. 7 is a block diagram showing an example of the arrangement of the image processing apparatus according to the second embodiment of the present invention.

FIG. 7 is a block diagram showing an example of the arrangement of an image sensing apparatus as an image processing apparatus according to the second embodiment of the present invention.

Reference numeral 701 denotes an image sensing element which converts a sensed image into an analog electrical signal. In FIG. 7, a CCD is exemplified. Alternatively, a CMOS may be used.

Reference numeral 702 denotes an A/D converter which converts an analog signal into a digital signal.

Reference numeral 703 denotes a system bus which connects respective processing unit in a camera in one way or two ways.

Reference numeral 704 denotes an image compression circuit which converts and compresses a digital signal of a sensed image into general-purpose image data such as JPEG or the like.

Reference numeral 705 denotes a system controller which controls the operation of an image display/image processing control device.

Reference numeral 706 denotes a recording medium which saves generated image data. The recording medium 706 includes a CompactFlash®, SmartMedia, Memory Stick, Microdrive, SD card, and the like.

Reference numeral 707 denotes a ROM which saves firmware for controlling the image sensing apparatus, and an image processing program. The image processing program includes a program code for executing image display/image processing control, and is executed via the system controller 705.

Reference numeral 708 denotes a RAM on which the generated image data, and image data or a program recorded on the recording medium are mapped.

Reference numeral 709 denotes a display unit (display) such as a liquid crystal display panel.

Reference numeral 710 denotes an operation unit which includes equipped operation buttons and a touch panel.

The system controller 705 executes the image processing program to display the user interface shown in FIG. 1 on the display 709. The user can input various instructions to the image processing program via the user interface using the operation unit 710. The user operation unit includes operation buttons, a touch panel, and the like equipped on the apparatus.

The operation of the color conversion processing in the image sensing apparatus according to this embodiment is the same as that in the first embodiment. This embodiment has explained the image sensing apparatus as an apparatus which can serve as the image processing apparatus according to the present invention and is other than the general-purpose computer. However, the present invention can be applied to arbitrary apparatuses such as a portable communication terminal and the like which can provide color conversion processing using a GUI.

Other Embodiments

The objects of the present invention are also achieved by supplying a storage medium, which records a program code of a software program that can implement the functions of the above-mentioned embodiments to a system or apparatus (e.g., an image sensing apparatus), and reading out and executing the program code stored in the storage medium by a computer (or a CPU or MPU) of the system or apparatus by, e.g., a remote operation from the system or apparatus.

In this case, the program code itself read out from the storage medium implements the functions of the embodiments, and the storage medium which stores the program code constitutes the present invention.

As the storage medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) or the like running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the aforementioned storage medium, that storage medium stores a program code corresponding to the flowchart described previously.

As many apparently widely different embodiments of the present invention can be made without departing from the spirit and scope thereof, it is to be understood that the invention is not limited to the specific embodiments thereof except as defined in the appended claims.

The invention claimed is:

1. An image processing apparatus characterized by comprising:
    image display unit for displaying a digital image;
    chromaticity diagram display unit for displaying a chromaticity diagram which expresses a color system, the chromaticity diagram including a hue/chroma diagram and a brightness diagram;
    selection unit for allowing a user to select a color from the digital image or the hue/chroma diagram;
    color object display unit for displaying the color selected by said selection unit on the chromaticity diagram displayed by said chromaticity diagram display unit as a color object, wherein the color object is displayed on both the hue/chroma diagram and the brightness diagram; and
    color object moving unit for moving the color object on the chromaticity diagram in response to a user operation, and
    wherein the color object moving unit moves, in response to a user operation to move the color object on the hue/chroma diagram, the color object on the hue/chroma diagram and automatically moves the color object on the brightness diagram in correspondence with the movement of the color object on the hue/chroma diagram,
    wherein both the color object originally displayed by said chromaticity diagram display unit and the color object moved by said color object moving unit are displayed on the chromaticity diagram displayed by said chromaticity diagram display unit and
    wherein said image display unit further displays, in addition to the digital image, a destination image generated by applying, to the digital image, a process for changing the color corresponding to the color object before moved to the color corresponding to the color object after moved by said color object moving unit.

2. The apparatus according to claim 1, characterized in that the color object displayed by said chromaticity diagram display unit is displayed in association with the color object moved by said color object moving unit.

3. The apparatus according to claim 1, characterized in that the chromaticity diagram displayed by said chromaticity diagram display unit indicates contents of at least one color system of an L*a*b* color system, XYZ color system, Munsell color system, RGB color system, USC color system, and L*c*h color system.

4. The apparatus according to claim 1, characterized in that said selection unit allows the user to select an arbitrary color on the digital image.

5. The apparatus according to claim 1, characterized in that said selection unit allows the user to select an arbitrary color on the chromaticity diagram displayed by said chromaticity diagram display unit.

6. The apparatus according to claim 1, characterized in that said color display unit displays at least one color object.

7. The apparatus according to claim 1, characterized in that at least one pair of the color object displayed by said chromaticity diagram display unit and the color object moved by said color object moving unit are displayed on the chromaticity diagram.

8. The apparatus according to claim 2, characterized in that the association between the color object displayed by said chromaticity diagram display unit and the color object moved by said color object moving unit is indicated by a display that connects the color objects via a line, and at least one of a line segment, line segment arrow, dotted line segment, and dotted arrow is displayed as the line.

9. The image processing apparatus according to claim 1, wherein the color object moving unit moves, in response to a user operation to move the color object on the brightness diagram, the color object on the brightness diagram and does not move the color object on the hue/chroma diagram.

10. The image processing apparatus according to claim 1, wherein the color object moving unit moves, in response to a user operation to move the color object on the hue/chroma diagram, the color object on the brightness diagram so that it indicates a constant brightness.

11. The image processing apparatus according to claim 1, wherein the hue/chroma diagram and the brightness diagram are displayed in a circular form and wherein hue/chroma gradually varies in the radial direction in the hue/chroma diagram and brightness gradually varies in the radius direction in the brightness diagram.

12. The image processing apparatus according to claim 11, wherein movement of the color object on the brightness diagram is restricted on a radius from a center of the brightness diagram to the color object.

13. The image processing apparatus according to claim 11, wherein the color object display unit displays the color object on the brightness diagram at a position corresponding to that of the color object on the hue/chroma diagram.

14. The image processing apparatus according to claim 13, wherein the color object display unit displays the color object on the brightness diagram at a position where the following angles are always equal to each other:
  an angle a straight line which is drawn in the vertical direction to pass through the center of the circle of the hue/chroma diagram makes with a straight line which passes through the center of the circle of the hue/chroma diagram and the color object on the hue/chroma diagram; and
  an angle a straight line which is drawn in the vertical direction to pass through the center of the brightness diagram makes with a straight line which passes through the center of the brightness diagram and the color object on the brightness diagram.

15. The image processing apparatus according to claim 1, wherein the color object can be moved plural times using a color selected by the selection unit as an origin.

16. The image processing apparatus according to claim 15, wherein if the color object is moved plural times, said image display unit displays, the destination image generated by applying, to the digital image, a process for changing the color corresponding to the color object before moved to the color corresponding to the last moved color object.

17. An image processing method characterized by comprising:
  an image display step of displaying a digital image on a display device;
  a chromaticity diagram display step of displaying a chromaticity diagram which expresses an arbitrary color system, the chromaticity diagram including a hue/chroma diagram and a brightness diagram;
  a selection step of allowing a user to select an arbitrary color from the digital image or the hue/chroma diagram;
  a color object display step of displaying the color selected in the selection step on the chromaticity diagram displayed in the chromaticity diagram display step as a color object, wherein the color object is displayed on both the hue/chroma diagram and the brightness diagram; and
  a color object moving step of moving the color object on the chromaticity diagram in response to a user operation, and
  wherein the color object moving step unit moves, in response to a user operation to move the color object on the hue/chroma diagram, the color object on the hue/chroma diagram and automatically moves the color object on the brightness diagram in correspondence with the movement of the color object on the hue/chroma diagram,
  wherein the color object displayed by said chromaticity diagram display step and the color object moved in the color object moving step are simultaneously displayed on the chromaticity diagram displayed in the chromaticity diagram display step.

18. The image processing method according to claim 17, wherein the color object moving unit moves, in response to a user operation to move the color object on the brightness diagram, the color object on the brightness diagram and does not move the color object on the hue/chroma diagram.

19. The image processing method according to claim 17, wherein the color object moving unit moves, in response to a user operation to move the color object on the hue/chroma diagram, the color object on the brightness diagram so that it indicates a constant brightness.

20. The image processing method according to claim 17, wherein the hue/chroma diagram and the brightness diagram are displayed in a circular form and wherein hue/chroma gradually varies in the radial direction in the hue/chroma diagram and brightness gradually varies in the radius direction in the brightness diagram.

21. The image processing method according to claim 20, wherein movement of the color object on the brightness diagram is restricted on a radius from a center of the brightness diagram to the color object.

22. The image processing method according to claim 20, wherein the color object display unit displays the color object on the brightness diagram at a position corresponding to that of the color object on the hue/chroma diagram.

23. The image processing method according to claim 22, wherein the color object display unit displays the color object on the brightness diagram at a position where the following angles are always equal to each other:
  an angle a straight line which is drawn in the vertical direction to pass through the center of the circle of the hue/chroma diagram makes with a straight line which passes through the center of the circle of the hue/chroma diagram and the color object on the hue/chroma diagram; and
  an angle a straight line which is drawn in the vertical direction to pass through the center of the brightness diagram makes with a straight line which passes through the center of the brightness diagram and the color object on the brightness diagram.

24. The image processing method according to claim 17, wherein the color object can be moved plural times using a color selected by the selection unit as an origin.

25. The image processing method according to claim 24, wherein if the color object is moved plural times, said image display unit displays, the destination image generated by applying, to the digital image, a process for changing the color corresponding to the color object before moved to the color corresponding to the last moved color object.

26. A computer readable storage medium that stores a program that causes a display controlling apparatus to execute the steps of claim 17.

* * * * *